United States Patent
Hassan et al.

(10) Patent No.: US 6,940,675 B2
(45) Date of Patent: Sep. 6, 2005

(54) EFFICIENT HARD DISK DRIVE ENERGY RECOVERY CIRCUIT AND METHOD AND A HARD DISK DRIVE INCORPORATING THE SAME

(75) Inventors: Mehedi Hassan, Plano, TX (US); Gregory Emil Swize, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/720,809

(22) Filed: Nov. 24, 2003

(65) Prior Publication Data

US 2005/0110444 A1  May 26, 2005

(51) Int. Cl.[7] ......................... G11B 15/18; G11B 17/00; G11B 19/02
(52) U.S. Cl. ..................... 360/69; 360/71; 360/73.01
(58) Field of Search ............... 360/69, 71, 73.01, 360/74.1; 318/376–378; 310/68 R, 68 B, 310/68 D, 74

(56) References Cited

U.S. PATENT DOCUMENTS

| | | | |
|---|---|---|---|
| 5,493,201 A * | 2/1996 | Baker | 322/10 |
| 2002/0043954 A1 * | 4/2002 | Hallidy | 318/727 |
| 2003/0075997 A1 * | 4/2003 | Keim et al. | 310/68 D |

* cited by examiner

Primary Examiner—David Hudspeth
Assistant Examiner—Jason Olson
(74) Attorney, Agent, or Firm—W. Daniel Swayze, Jr.; W. James Brady; Frederick J. Telecky, Jr.

(57) ABSTRACT

A hard disk drive energy recovery circuit, a method of recovering energy from a motor of a hard disk drive and a hard disk drive. In one embodiment, the hard disk drive energy recovery circuit includes (1) a spindle resolver that generates transition signals as a spindle motor of the hard disk drive rotates among angular regions, (2) a spindle region state machine, coupled to the spindle resolver, that receives the transition signals and generates rectifier drive signals based thereon and (3) a synchronous rectifier, coupled to the spindle region state machine, that employs the rectifier drive signals to recover electrical energy from the motor.

21 Claims, 2 Drawing Sheets

EFFICIENT HARD DISK DRIVE ENERGY RECOVERY CIRCUIT AND METHOD AND A HARD DISK DRIVE INCORPORATING THE SAME

TECHNICAL FIELD OF THE INVENTION

The present invention is directed, in general, to hard disk drives for computers and, more specifically, to an efficient circuit for, and method of, recovering energy from the hard disk drive and a hard disk drive incorporating the circuit or the method.

BACKGROUND OF THE INVENTION

Hard disk drives are used as mass storage devices in all manner of computers and have become commonplace. Conventional hard disk drive have a platter that is used to store the data, a spindle that spins the platter rapidly (e.g., 7200 RPM) for reading and writing the data and a motor that rotates the spindle. Additionally, hard disk drives include a read/write head that floats on a cushion of air created as the platter spins underneath the read/write head. The read/write head is coupled to an actuator that places it over the portion of the platter from which data are to be read or to which data are to be written. A disk controller controls the movement of the read/write head, the reading and writing of data and other functions of the hard disk drive.

Hard disk drives cannot be simply turned off, because the cushion of air dissipates before the platter stops spinning. Lacking an air cushion, the read/write head comes into contact with the platter, scoring it and destroying data and perhaps the whole drive.

To prevent this, the disk controller should park the read/write head beside the platter or on a designated landing zone on the platter while there is still a cushion of air. Thus, properly powering-down a hard disk drive involves moving the read/write head to a preferred parking position and then often affirmatively braking the platter. The disk controller requires power to perform these operations. However, that power has been interrupted by virtue of having turned off the hard disk drive.

To provide for a proper power-down, back electromotive force (emf) derived from the mechanical inertia of the decelerating platter is often recovered from wye windings on the motor, rectified in half H-bridge rectifiers and stored in a capacitor to provide temporary power for the disk controller to allow it to perform its power-down operations. Thus, the motor is advantageously used as a generator during a loss of normal operating power to the hard disk drive with the energy stored on the capacitor.

Unfortunately, rectification of the voltage from the motor is not efficient since voltage drops occurs across both upper and lower diodes of the half H-bridges. Since the voltage drop across each diode is about 0.7 volts, a total voltage drop of about 1.4 volts occurs during rectification, resulting in less voltage (and thus power) delivered to the capacitor. As a result, the capacitor is required to be larger, often translating into higher manufacturing costs.

Accordingly, what is needed in the art is a more efficient hard disk drive when recovering energy during a loss of power. Additionally, a method of efficient energy recovery from a spinning platter is also desired.

SUMMARY OF THE INVENTION

To address the above-discussed deficiencies of the prior art, the present invention provides a hard disk drive energy recovery circuit, a method of recovering energy from a motor of a hard disk drive and a hard disk drive. In one embodiment, the hard disk drive energy recovery circuit includes (1) a spindle resolver that generates transition signals as a spindle motor of the hard disk drive rotates among angular regions, (2) a spindle region state machine, coupled to the spindle resolver, that receives the transition signals and generates rectifier drive signals based thereon and (3) a synchronous rectifier, coupled to the spindle region state machine, that employs the rectifier drive signals to recover electrical energy from the motor.

The present invention introduces the broad concept of employing active and state-machine-governed switching to provide accurate full wave rectification of back emf on the motor during a loss of power to the hard disk drive. The rectified back emf voltage is efficiently delivered to an energy storage device to provide power to properly power-down the hard disk drive. Active switching avoids voltage drops across diodes when rectifying to deliver more power to the energy storage device. The energy storage device, therefore, can be smaller. Additionally, the spindle region state machine is used to prevent "chatter" at transitions of the angular regions. "Chatter" occurs when two back emf are crossing. "Chatter" and the advantages of avoiding it will be described in the Detailed Description that follows.

In another aspect, the present invention provides the method of recovering energy from a spindle motor of a hard disk drive. The method may include (1) generating transition signals as a spindle motor of the hard disk drive rotates among angular regions, (2) generating rectifier drive signals based on the transition signals and (3) employing the rectifier drive signals to recover electrical energy from the motor.

In yet another aspect, the present invention may provide the hard disk drive, including (1) a motor having a spindle, (2) a storage medium coupled to the spindle for rotation thereby and (3) a hard disk drive energy recovery circuit. The hard disk drive energy recovery circuit may include (3a) a spindle resolver that generates transition signals as the spindle rotates among angular regions, (3b) a spindle region state machine, coupled to the spindle resolver, that receives the transition signals and generates rectifier drive signals based thereon and (3c) a synchronous rectifier, coupled to the spindle region state machine, that employs the rectifier drive signals to recover electrical energy from the motor.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclose conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
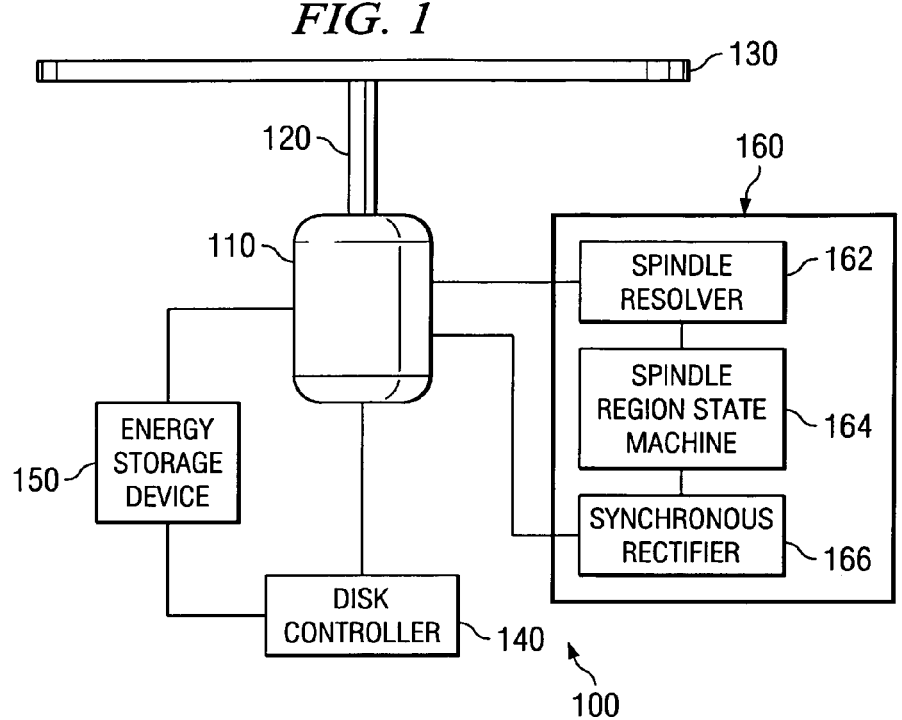
FIG. 1 illustrates a system diagram of an embodiment of a hard disk drive constructed in accordance with the principals of the present invention.

Referring initially to FIG. 1, illustrated is a system diagram of an embodiment of a hard disk drive, generally designated 100, constructed in accordance with the principals of the present invention. The hard disk drive 100 includes a motor 110, a spindle 120, a storage medium 130, a disk controller 140, an energy storage device 150 and a hard disk drive energy recovery circuit 160. The hard disk drive energy recovery circuit 160 includes a spindle resolver 162, a spindle region state machine 164 and a synchronous rectifier 166.

The hard disk drive 100 is configured to store and retrieve bits of data. For example, the hard disk drive 100 may provide data storage for a computer. The hard disk drive 100 may include additional components that are not illustrated but are commonly employed in a conventional hard disk drive for data storage and retrieval. For example, the hard disk drive 100 may include an actuator, an actuator arm and a read/write head. One skilled in the pertinent art will understand the storage and retrieval of data to/from a hard disk drive in a computer.

The motor 110 is a three phase wye motor configured to rotate the spindle 120 and thereby rotate the storage medium 130. The motor 110 may include circuitry, such as, a motor drive controller, to control operation thereof. Typically, the motor drive controller includes a feedback control circuit to control the rotation of the spindle 120 and ensure a constant speed. The disk controller 140 also provides controls for the motor 110. For example, the disk controller 140 may coordinate rotation of the spindle 120 with movement of a read/write head to read/write data bits at designated sectors and tracks on the storage medium 130.

The storage medium 130 is a conventional platter configured to store the data bits in the designated sectors and tracks. The storage medium 130 may include three disks of an aluminum alloy with a data medium of a magnetizable coating deposited on each side of the disks. Of course, other types of storage mediums may be employed for the hard disk drive 100.

The disk controller 140 is configured to control the operation of the hard disk drive 100. The disk controller 140 includes power-down circuitry to perform functions, e.g., retracting and braking, that operate during a loss of normal operating power to the hard disk drive 100. Additionally, the disk controller 140 may include other control circuitry typically employed by a conventional disk controller.

The energy storage device 150 is configured to receive rectified voltage from the motor 110 during loss of normal operating power to the hard disk drive 100 and provide power for the disk controller 140 during the power loss. In some embodiments, the energy storage device 150 provides power for at least the power-down circuitry during the power loss to safely power-down the hard disk drive 100. The energy storage device 150 may be a capacitor.

The hard disk drive energy recovery circuit 160 is configured to recover power through the windings of the motor 110 from the inertia of the spinning storage medium 130 during a loss of normal operating power to the hard disk drive 100. The spindle resolver 162 generates transition signals as the spindle 120 rotates among angular regions. Typically, the transition signals represent six angular regions of the spindle 120. In one embodiment, the spindle resolver 162 may employ comparators to generate the transition signals.

The spindle region state machine 164, coupled to the spindle resolver 162, is configured to receive the transition signals and generate rectifier drive signals based thereon. The spindle region state machine 164 includes logic circuitry to generate the desired rectifier drive signals based on the transition signals received. The spindle region state machine 164 is configured to latch the rectifier drive signals upon initial transition to subsequent angular regions. Thus, the spindle region state machine 164 may receive the transition signals, determine the next angular region based on the transition signals and advantageously latch that angular region to prevent chattering that can occur around transitions between angular regions. Once a particular angular region is known, then subsequent angular regions are also known and the spindle region state machine 164 can generate the appropriate rectifier drive signals. In some embodiments, the spindle region state machine 164 generates equivalent rectifier drive signals for different angular regions.

The synchronous rectifier 166, coupled to the spindle region state machine 164, is configured to employ the rectifier drive signals to recover electrical energy from the motor 110. The synchronous rectifier 166 includes logic circuitry to control rectification of the voltage from the motor 110 during a power loss. A portion of the synchronous rectifier 164 may be included within the motor 110. In some embodiments, a portion of the synchronous rectifier 164 may include transistors and diodes of half H-bridges used to control the motor 110 during normal operations. The rectifier drive signals may be employed to control an upper and lower switch of a half H-bridge for each of the three phases of the motor 110 to provide a rectified voltage for the energy storage device 150. Thus, two voltage drops across diodes may be eliminated compared to conventional back emf rectifiers of hard disk drives that do not employ active full-wave rectification. In other embodiments, only the low side switches of the half H-bridge of the synchronous rectifier 166 may be controlled. In these embodiments, only a single diode voltage drop may be eliminated when compared to conventional back emf rectifiers of hard disk drives. The switches employed in the half H-bridges may be transistors. Typically, the switches are power Double Diffused MOS (DMOS) transistors.

Figure 2:
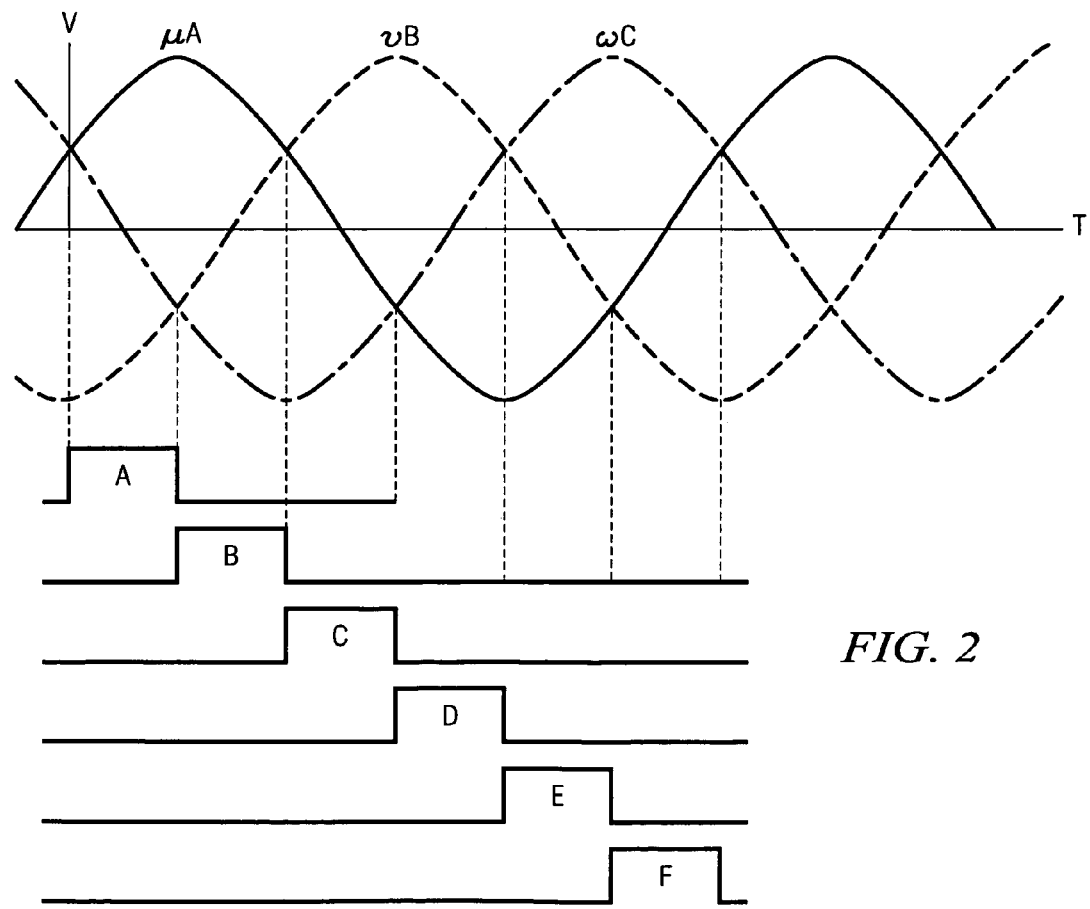
FIG. 2 illustrates a three phase waveform of voltage from a motor of a hard disk drive constructed in accordance with the principals of the present invention and a diagram representing outputs of a spindle resolver based on the waveform.

Turning now to FIG. 2, illustrated is a graph of a waveform representing a three phase voltage from a wye motor of a hard disk drive constructed in accordance with the principals of the present invention and a diagram representing outputs of a spindle resolver based on the waveform. The vertical scale of the graph represents voltage and the horizontal scale of the graph represents time. The waveform represents the voltage created from the back emf of the windings of the motor when the hard disk drive loses normal operating power and the motor becomes a generator. The waveform includes a U phase, a V phase and a W phase that each have a 360 degree cycle. Each of the phases U, V, W, are 120 degrees out-of-phase with each of the other phases.

Beneath the waveforms, the diagram includes six logical outputs from a spindle resolver that is used to indicating six angular regions A–F. The beginning and end of each of the angular regions are denoted by vertical dashed lines corresponding with intersections of two of the phases U, V, W. For example, angular region A is between the intersection of phases U and W and the intersection of phases V and W. Once an angular region is determined, subsequent angular regions are known. Once angular region D, for instance, is determined, the subsequent angular regions will be E, F, A, B and C in that order. Thus a spindle region state machine coupled to the spindle resolver may latch a determined angular region based on the transition signals until transitioning to the next expected angular region. Accordingly, chattering may be prevented between, for example, a selection of angular region C and D, since only angular region E is the expected subsequent angular region after angular region D. The present invention, therefore, provides improved rectification by preventing fluctuations between waveforms selected to provide power supplied to an energy storage device.

So, the present invention provides a method of efficiently recovering electrical energy from the motor of the hard disk drive. The electrical energy is recovered from the voltage waveforms by generating transition signals as the spindle of the motor rotates among the angular regions. Typically, the transition signals are generated at the beginning of each angular region. The transition signals may be generated by the spindle resolver 162 of FIG. 1.

Based on the transition signals, rectifier drive signals are generated. The rectifier drive signals may be the designed output of logic circuitry based on comparing the phases U, V, W, at each of the angular regions. The rectifier drive signals may be generated by the spindle region state machine 164 of FIG. 1.

The rectifier drive signals are employed to recover the electrical energy from the motor. The synchronous rectifier 166 of FIG. 1 may employ the rectifier drive signals to recover the electrical energy. In one embodiment, the rectifier drive signals may turn-on switches of a half H-bridge to provide an efficient recovery of the electrical energy from the motor 110 of FIG. 1.

Figure 3:
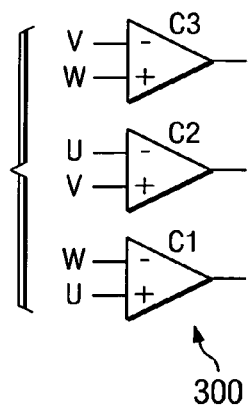
FIG. 3 illustrates a block diagram of an embodiment of a spindle resolver constructed in accordance with the principals of the present invention.

Turning now to FIG. 3, illustrated is a block diagram of an embodiment of a spindle resolver, generally designated 300, constructed in accordance with the principals of the present invention. The spindle resolver 300 includes a first, second and third comparator 320, 340, 360, respectively, that are jointly referred to as the comparators. The comparators are conventional comparators used to compare two analog signals and provide a logical output based on the comparison. The spindle resolver 300 generates the transition signals employing the comparators. Each of the comparators are coupled to two phases of a motor, such as, either phases U, V, W of FIG. 2.

The transition signals provided by the spindle resolver 300 are the logical outputs of the comparators. For example, the first comparator 320 is coupled to the phases U and W, the second comparator 340 is coupled to the phases U and V and the third comparator 360 is coupled to the phases V and W. Thus, referring back to FIG. 2, at angular region A, the output of the first comparator 320 is 1, the output of the second comparator 340 is 0 and the output of the third comparator 360 is 1. The transition signals, therefore, from the spindle resolver 300 at angular region A are a logical 1, 0, and 1. The spindle resolver 300 sends the transition signals to a spindle state machine that generates rectifier drive signals based thereon. Operation of the spindle resolver 300 is discussed below in more detail with reference to FIG. 4 and TABLE 1.

Figure 4:
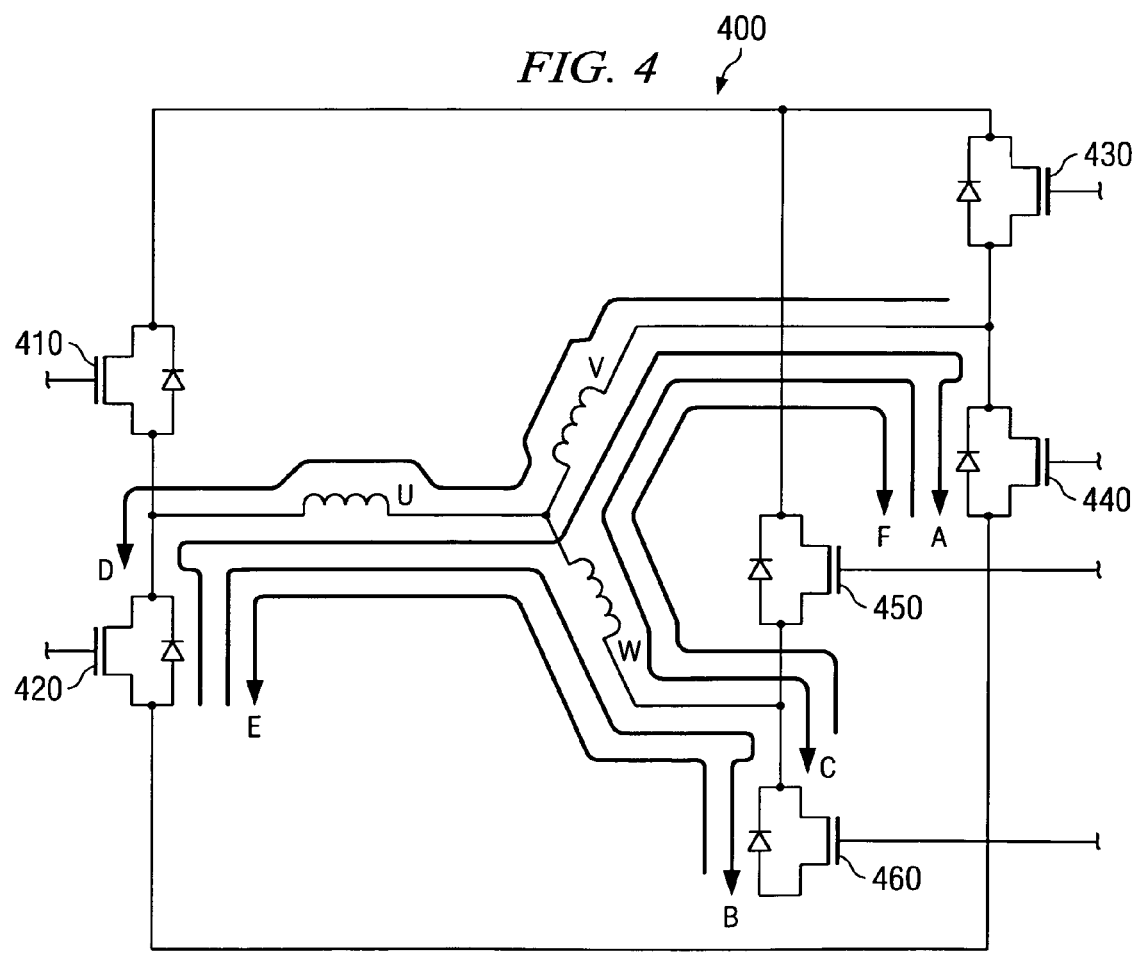
FIG. 4 illustrates a system diagram of an embodiment of a motor and a synchronous rectifier constructed in accordance with the principals of the present invention.

Turning now to FIG. 4, illustrated is a system diagram of an embodiment of a motor of a hard disk drive, generally designated 400, constructed in accordance with the principals of the present invention. The motor 400 is a wye motor having a U winding, a V winding and a W winding that generates the voltage waveforms of FIG. 2. Typically, the motor 400 is coupled to a normal operating voltage supply, an energy storage device and additional circuitry such as a disk controller that includes power-down circuitry. The motor 400 includes a half H-bridge for each phase of the windings. Each of the three half H-bridges includes a lower switch in parallel with a diode and an upper switch in parallel with a diode. The half H-bridges include upper U switch 410, lower U switch 420, upper V switch 430, lower V switch 440, upper W switch 450 and lower W switch 460. Under normal operating voltage, each of the switches are controlled by, for example, circuitry within a disk controller to rotate a spindle for reading and writing data to a storage medium. During loss of normal operating power, each of the switches are controlled by a synchronous rectifier employing rectifier drive signals.

For example, referring back to FIG. 3 and the corresponding discussion, at angular region A, the spindle resolver 300 generated the transition signals 1, 0, 1. A spindle state machine receives the transition signals and generates rectifier drive signals. A synchronous rectifier may employ the rectifier drive signals to turn-on the lower V switch 440. Thus, during angular region A, current flows through the motor 400 as indicated and voltage is provided to the energy storage device coupled thereto. Since the lower V switch 440 is turned-on by the rectifier drive signals, a voltage drop across the corresponding diode does not occur and more voltage is provided to the energy storage device. Of course, one skilled in the pertinent art will understand that the rectifier drive signals may also turn-on the upper U switch 410 during angular region A to prevent another voltage drop across that corresponding diode.

TABLE 1, below, represents operation of the switches in FIG. 4 in response to the angular regions illustrated in FIG. 2 and employing the spindle resolver 300 of FIG. 3. For ease of discussion, only operation of the lower switches is discussed and included in TABLE 1 to prevent a single voltage drop across corresponding diodes. The present invention, however, encompasses operation of the upper switches that may prevent an additional diode voltage drop.

TABLE 1

Switch Operation as a Function of Angular Region

| ANGULAR REGION | TRANSITION SIGNALS | | | RECTIFIER DRIVE SIGNALS | STATUS OF OTHER LOWER SWITCHES |
|---|---|---|---|---|---|
| | C3 | C2 | C1 | | |
| A | 1 | 0 | 1 | Turn on low V switch 440 | Low U, W, switches 420, 460 are off |
| B | 0 | 0 | 1 | Turn on low W switch 460 | Low U, V, switches 420, 440 are off |

TABLE 1-continued

Switch Operation as a Function of Angular Region

| ANGULAR REGION | TRANSITION SIGNALS C3 | C2 | C1 | RECTIFIER DRIVE SIGNALS | STATUS OF OTHER LOWER SWITCHES |
|---|---|---|---|---|---|
| C | 0 | 1 | 1 | Turn on low W switch 460 | Low U, V, switches 420, 440 are off |
| D | 0 | 1 | 0 | Turn on low U switch 420 | Low V, W, switches 440, 460 are off |
| E | 1 | 1 | 0 | Turn on low U switch 420 | Low V, W, switches 440, 460 are off |
| F | 1 | 0 | 0 | Turn on low V switch 440 | Low U, W, switches 420, 460 are off |

Column 2 of TABLE 1 represents transition signals that the spindle resolver 300 generates for each angular region denoted in FIG. 2. Additionally, column 3 of TABLE 1 represents actions a synchronous rectifier performs based on rectifier signals a spindle region state machine generates based on the transition signals. Furthermore, column 4 of TABLE 1 represents the status of other lower switches during the angular regions. In this embodiment, the upper switches are open during a loss of normal operating power.

Although the present invention has been described in detail, those skilled in the art should understand that they can make various changes, substitutions and alterations herein without departing from the spirit and scope of the invention in its broadest form.

What is claimed is:

1. A hard disk drive energy recovery circuit, comprising:
    a spindle resolver that generates transition signals as a spindle motor of said hard disk drive rotates among angular regions;
    a spindle region state machine, coupled to said spindle resolver, that receives said transition signals and generates rectifier drive signals based thereon; and
    a synchronous rectifier, coupled to said spindle region state machine, that employs said rectifier drive signals to recover electrical energy from said motor.

2. The circuit as recited in claim 1 wherein said spindle region state machine latches said rectifier drive signals.

3. The circuit as recited in claim 1 wherein said spindle resolver employs comparators to generate said transition signals.

4. The circuit as recited in claim 1 wherein said transition signals represent six angular regions.

5. The circuit as recited in claim 1 wherein said rectifier drive signals control only low side switches of a half H-bridge of said synchronous rectifier.

6. The circuit as recited in claim 1 wherein said rectifier drive signals control power dmos transistors coupled to windings of said motor.

7. The circuit as recited in claim 1 wherein said spindle region state machine generates equivalent rectifier drive signals for different angular regions.

8. A method of recovering electrical energy from a motor of a hard disk drive, comprising:
    generating transition signals as a spindle of said motor rotates among angular regions;
    generating rectifier drive signals based on said transition signals; and
    employing said rectifier drive signals to recover electrical energy from said motor.

9. The method as recited in claim 8 further comprising latching said rectifier drive signals.

10. The method as recited in claim 8 wherein comparators are employed for said generating said transition signals.

11. The method as recited in claim 8 further comprising generating said transition signals to represent six angular regions.

12. The method as recited in claim 8 further comprising employing said rectifier drive signals to control only low side switches of a half H-bridge of a synchronous rectifier.

13. The method as recited in claim 8 wherein said rectifier drive signals control power dmos transistors coupled to windings of said motor.

14. The method as recited in claim 8 further comprising generating equivalent rectifier drive signals for different angular regions.

15. A hard disk drive, comprising:
    a motor having a spindle;
    a storage medium coupled to said spindle for rotation thereby; and
    a hard disk drive energy recovery circuit, including:
        a spindle resolver that generates transition signals as said spindle rotates among angular regions;
        a spindle region state machine, coupled to said spindle resolver, that receives said transition signals and generates rectifier drive signals based thereon; and
        a synchronous rectifier, coupled to said spindle region state machine, that employs said rectifier drive signals to recover electrical energy from said motor.

16. The hard disk drive as recited in claim 15 wherein said spindle region state machine latches said rectifier drive signals.

17. The hard disk drive as recited in claim 15 wherein said spindle resolver employs comparators to generate said transition signals.

18. The hard disk drive as recited in claim 15 wherein said transition signals represent six angular regions.

19. The hard disk drive as recited in claim 15 wherein said rectifier drive signals control only low side switches of a half H-bridge of said synchronous rectifier.

20. The hard disk drive as recited in claim 15 wherein said rectifier drive signals control power dmos transistors coupled to windings of said motor.

21. The hard disk drive as recited in claim 15 wherein said spindle region state machine generates equivalent rectifier drive signals for different angular regions.

* * * * *